March 5, 1963   E. WILDHABER   3,079,808
GEAR DRIVE WITH WORM GEARING
Filed Feb. 8, 1960   3 Sheets-Sheet 1
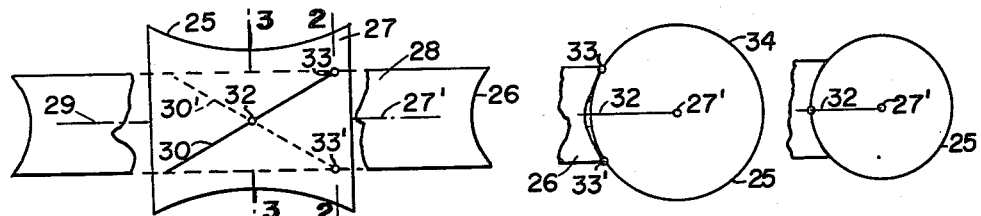
FIG. 1   FIG. 2   FIG. 3
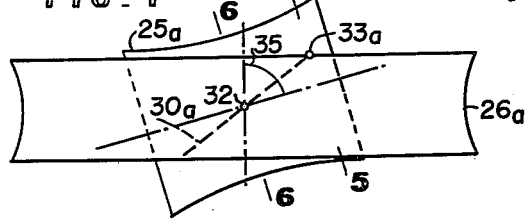 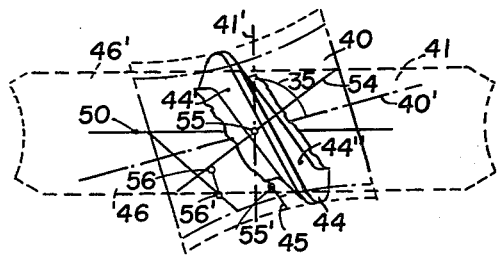 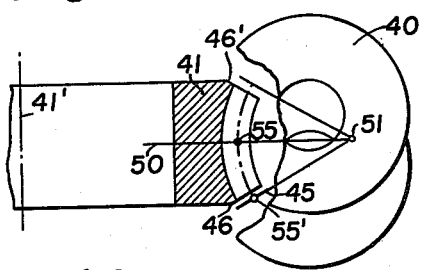
FIG. 4   FIG. 5   FIG. 6
FIG. 7   FIG. 8
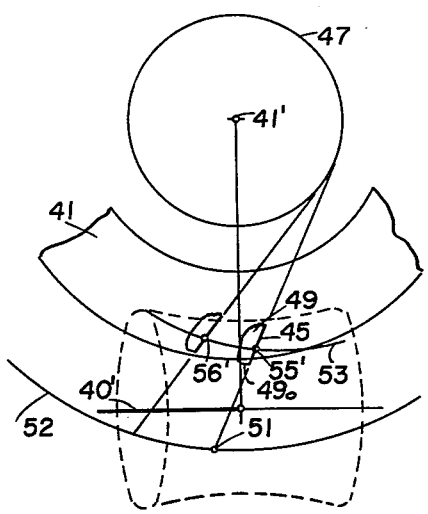 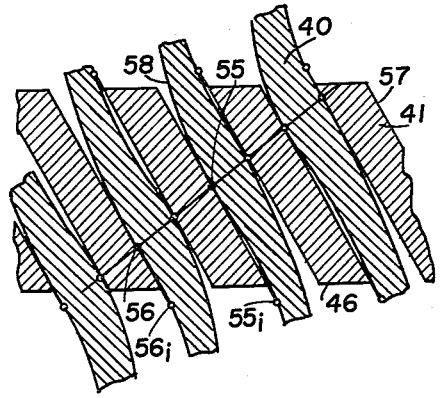
FIG. 9   FIG. 10
INVENTOR:
Ernest Wildhaber March 5, 1963  E. WILDHABER  3,079,808
GEAR DRIVE WITH WORM GEARING
Filed Feb. 8, 1960  3 Sheets-Sheet 2

INVENTOR:
Ernest Wildhaber

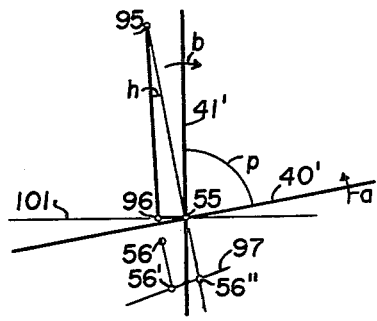
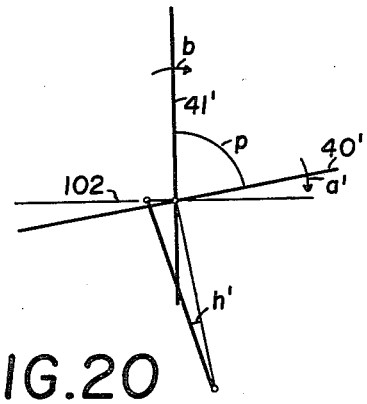
FIG.19   FIG.20
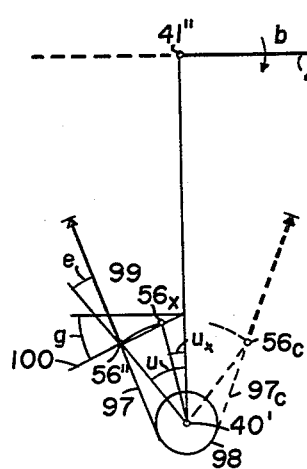
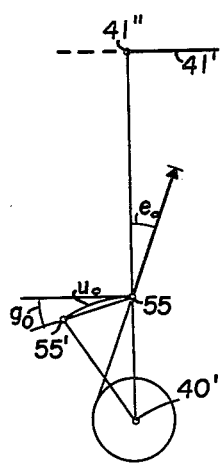
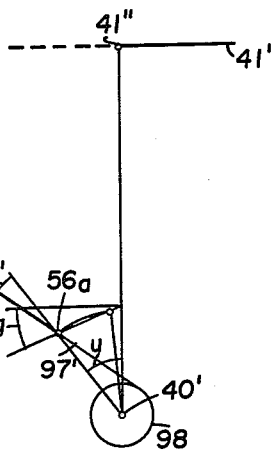
FIG.21   FIG.23   FIG.22
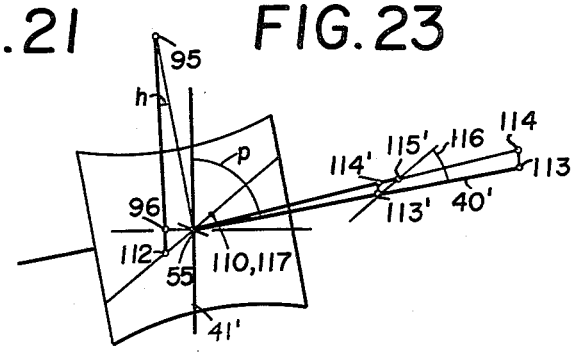
FIG. 24

3,079,808
Patented Mar. 5, 1963

3,079,808
GEAR DRIVE WITH WORM GEARING
Ernest Wildhaber, Brighton, N.Y.
(124 Summit Drive, Rochester 20, N.Y.)
Filed Feb. 8, 1960, Ser. No. 7,332
13 Claims. (Cl. 74—458)

The present invention relates to gear drives with worm gearing. Its objects are to materially improve the worm gearing thereof by a favorable disposition of the axes of rotation, to improve the path of contact of the worm gearing so that more teeth are in simultaneous engagement, to create lines of instantaneous tooth contact that extend obliquely across the thread surfaces of the worm even when the worm is a single-threaded cylindrical worm with helical tooth sides or thread sides of constant lead, to add to the life and the load capacity of the gearing.

Hitherto angular worm gearing, with shaft angles other than a right angle, have been shied away from whenever possible. Often an extra pair of gears was used to avoid the necessity of an angular wormgear drive, the term angular referring to a shaft angle other than a right angle. Certainly no one ever devised deliberately an angular wormgear drive when there was no outside need for it. Yet this is exactly what the present invention does. With an imput shaft and an output shaft at right angles or parallel to one another an angular wormgear pair is here used, together with one or more pairs of gears, to connect said shafts. The angular wormgear pair has a shaft angle differing from a right angle by less than thirty degrees, and generally by an angle between five and twenty degrees. The invention is based on the discovery that great benefits are obtainable thereby, as will be more fully described.

A further object is to devise a novel wormgear drive, with hourglass worm and enveloping wormgear, having a shaft angle other than a right angle, and to provide teeth thereon with very intimate tooth contact and with a longer duration of tooth contact than can be achieved with comparable right angle drives.

Other objects will appear in the course of the specification and in the recital of the appended claims.

In the drawings:
FIGURES 1 to 6 are diagrams for explaining the principles underlying the invention with the contact of pitch surfaces.

FIG. 1 is a diagrammatic plan view of a double-enveloping wormgear pair whose axes are at right angles to one another. FIGURES 2 and 3 are sections along lines 2—2 and 3—3 of FIG. 1 respectively.

FIG. 4 is a diagrammatic plan view of a double-enveloping wormgear pair whose axes are at an acute angle to one another. FIGURES 5 and 6 are sections taken at right angles to the worm axis, along lines 5—5 and 6—6 of FIG. 4 respectively.

FIG. 7 is a diagrammatic plan view of a wormgear drive constructed according to the present invention and comprising an hourglass worm and an enveloping wormgear with concave tooth bottoms.

FIG. 8 is an axial section of the wormgear of FIG. 7, showing also the worm fragmentarily and diagrammatically.

FIG. 9 is a diagrammatic front view corresponding to FIG. 7, with the worm shown in dotted lines.

FIG. 10 is a fragmentary and diagrammatic section along the pitch surface of the wormgear shown in FIGS. 7 to 9, shown in partial development and at an enlarged scale.

FIGURES 19 to 23 are diagrams explanatory of a preferred computation procedure for double-enveloping angular worm gearing.

FIG. 24 is a diagrammatic plan view of the pitch surface of an hourglass worm of an angular wormgear drive, describing a modified tooth shape and a modified production.

Figure 11:
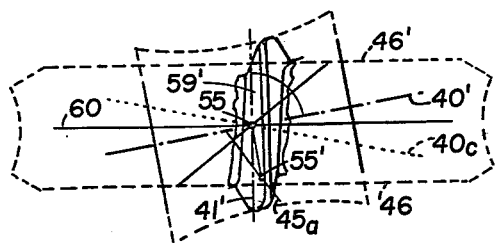
FIG. 11 is a diagrammatic plan view similar to FIG. 7, but showing a worm of opposite hand set to a shaft angle differing in the same direction from a right angle.

Double enveloping worm gearings with axes at right angles, such as for instance the Cone and Hindley worm gearings, achieve very intimate tooth contact but have definite limitations. There the thread surfaces of the worm are defined in principle as the relative path of a line that lies in the mid-plane of the wormgear and moves with the wormgear as the worm turns as if meshing with the wormgear. Accordingly the worm and wormgear have this profile line in the mid-plane in common with each other. The textbooks still call the mid-plane the surface of action, where the tooth contact is. However this is only edge contact, as pointed out by experts many decades ago. The reason for the edge contact is the change in lead angle of the worm due to its change in radius. The profile in the mid-plane of the wormgear should be properly called the interference line, the line where the thread surface of the worm intersects the tooth surface or extended tooth surface of the wormgear.

What the early experts did not point out is that there is another region of contact, which runs diagonally across the mid-plane. This is the real contact which carries the load. This contact is intimate, and its intimacy increases up to the center line of the gear pair. There the two contacting tooth surfaces have matching curvatures. But this is also the end of the useful contact. Beyond no tangential contact is possible.

The contact intimacy of the teeth is related to the contact intimacy of the pitch surfaces that have a line of contact coinciding with the path of contact of the teeth. The meaning of pitch surfaces on gears with angularly disposed and offset axes is described in my allowed patent application Serial No. 544,270, now Patent No. 2,930,248, granted March 29, 1960 and in my articles "Basic Relationship of Hypoid Gears" published 1946 in "American Machinist."

The pitch surfaces 25, 26 of the worm 27 and wormgear 28 contact along an inclined line 30 (FIG. 1). They are surfaces of revolution extending about the axes 27', 28' of the respective members, and are thus symmetrical surfaces with respect to the mid-plane 29 of the wormgear. Because of this symmetry the mirror image 30′, with respect to the mid-plane, of line 30 is also a line of contact between the pitch surfaces. The two contact lines 30, 30′ cross on the center line 32 of the wormgear pair. In the cross-section 2—2 (FIG. 2) there are two points of contact 33, 33′ with the circular section 34 of the worm pitch surface. In the cross-section 3—3 at the middle (FIG. 3) the two points of contact have moved together to a point on center line 32, the pitch point. Here the contact between the pitch surfaces is most intimate. At this point the curvatures of the two pitch surfaces are matched completely. Their curvature centers coincide and lie on the worm axis 27′.

Because of their symmetry the contacting pitch surfaces do not interfere with each other, but get clear of one another on both sides of center line 32. But the tooth surfaces based on these pitch surfaces lack the symmetry of the pitch surfaces. They interfere with each other on one side of the pitch point.

The complete match of the curvatures at the pitch point is avoided when the shaft angle 35 differs from a right angle (FIG. 4). Here there is only one line of contact, 30a, between the pitch surfaces 25a, 26a. There is only one point of contract 33a in section 5—5. And in the section 6—6 through the center line 32 the sectional curves of the pitch surfaces hug each other, but do not match entirely. They have different centers of curvature 36, 37 (FIG. 6). This is reflected in tooth surfaces that do not interfere. Their curvatures are not completely equal and matched at the pitch point.

Accordingly with shaft angles differing from a right angle proper tooth action along a path of contact 30a through the center line 32 is possible. The surface of action may cross the center line and extend on both sides thereof. The invention uses a shaft angle differing from a right angle just enough to place interference outside of the boundaries of the teeth and adjacent the tooth ends. This utilizes the teeth fully and avoids interference portions altogether. It also removes the threat of interference after some wear sets in.

Improvements in double-enveloping wormgear drives with right shaft angles are described in my allowed applications Serial Nos. 682,804; 695,623; 701,792; now Patents Nos. 2,935,886, 2,935,887 and 2,935,888, granted May 10, 1960 which are also referred to for clarifying the often misunderstood double-enveloping worm gearings. Here the path of tooth contact is extended by offsetting it from the center line of the wormgear pair. But with the longer contact there is nevertheless also an interference line on the tooth sides of the wormgear or on the thread sides of the worm. And the region beyond this interference line does not provide driving contact and remains a disturbance threat after wear sets in. This threat is entirely avoided with the double-enveloping angular worm gearing of the present invention, which also extends the tooth contact further.

FIGURES 7 to 10 illustrate one embodiment thereof. The gearing comprises an hourglass worm 40 with rotational axis 40′ and an intermeshing enveloping wormgear 41 with axis 41′ and concave tooth bottoms 42 (FIG. 8). The axes 40′, 41′ are set at an acute shaft angle 35 to one another, at an angle differing from a right angle by less than thirty degrees. The side 44′ of the worm thread 44 in principle is such as may be described by a straight line 45 that moves together with the wormgear while the worm turns on its axis as if meshing with the wormgear. Line 45 may be called the interference line or generating line. It extends outside of and adjacent to the end face 46 of the wormgear 41. The opposite thread side 44″ is identical with side 44′.

The worm can be produced by embodying line 45 with the cutting edge of a tool 49. As the tool turns about axis 41′ it is also moved lengthwise of line 45 to cut to the desired depth. When turning in clockwise direction (FIG. 9), from right to left, it moves also upwardly, towards the point of tangency of line 45 with circle 47. The motion along line 45 is made so that the outer end $49_0$ of the tool tracks a given root surface of the worm, either exactly or approximately. In the latter case the motion along line 45 may be made uniform, in direct proportion to the turning motion about axis 41′.

As will be described hereafter, the shaft angle 35 is preferably so determined that the pitch point 55 on center line 32 lies on the path of gear contact. It will also be shown how the path of contact in any surface of revolution of the worm may be determined.

The generating line 45 intersects the mid-plane 50 of the wormgear 41 at a point 51 (FIG. 9), which on rotation about axis 41′ describes a circle 52 in the mid-plane. The surface of revolution described by straight line 45 is known as a hyperboloid. A pitch surface, or surface of revolution along which the thread sides extend, may be assumed on the worm. It intersects the said hyperboloid in a curve 53. Each point of curve 53 has a corresponding point of mesh on the assumed pitch surface. Corresponding points lie on a circle about the worm axis. Point 55′ corresponds to the pitch point 55 itself. Point 56′ corresponds to a mesh point 56 (FIG. 7) to be determined hereafter. The path of contact 55—56 runs diagonally across the pitch surface. FIG. 7 shows its tangent 54 at pitch point 55.

FIG. 10 is a fragmentary and diagrammatic section along the pitch surface of the wormgear. Its circular profile in the mid-plane 50 is laid down into the drawing plane. As we want to show the difference of the sectional profiles of the worm and wormgear rather than the profiles themselves, the gear sectional profiles are shown as straight lines 57. The gear profile 57 and worm profile 58 contact at a point of path 55—56 and get clear of each other on both sides of the contact point. On one side of the contact point they approach again, to intersect at a point ($55_1$, $56_1$ and others) of the interference line. As these intersection points are outside of the end face of the wormgear, there is no interference, while the tooth contact is kept the most intimate possible.

The intimacy of tooth contact increases with decreasing distance of the mesh point from the interference line. The curvatures of the contacting tooth surfaces are completely matched where the path of contact reaches the interference line just outside of the boundaries of the gear teeth. The two sides of the teeth and threads are identical respectively, and their interference lines are on opposite sides of the wormgear.

The worm 40 may be made with a cutting tool 49 which turns about an axis 41′ as described and moves lengthwise of its cutting edge. Axis 41′ coincides with the wormgear axis exactly or approximately. A hob to represent the worm may be made in the same manner, adding a relieving motion. The wormgear 41 is cut with this hob with the usual cutting and feed motions.

A worm thread side produced by a cutting edge 45 matches this cutting edge and contains a constant straight profile in a surface of revolution about axis 41′. More broadly, it has a constant general profile inclination in a surface of revolution whose axis is offset from and disposed at an acute angle to the worm axis. This offset axis approximately coincides with the axis of the mating wormgear.

In plane sections perpendicular to the wormgear axis the profile inclination of the worm thread changes from one end face of the wormgear to the other. On the side 44′ described by line 45 it decreases from end face 46′ to end face 46, as is apparent from the decreasing width in FIG. 7 of the projected thread sides. The interference lines 45 are outside of and adjacent to end face 46 where the said profile inclination is smaller. When the worm 40 drives with this side, end face 46′ is at the entering side of the worm thread, and end face 46 is at the leaving side. The interference line 45 is at the leaving side.

FIG. 11 shows a worm of opposite hand. Here the profile inclination in plane sections perpendicular to the wormgear axis increases from end face 46' to end face 46 on the thread sides 59'. The interference line or generating line $45_a$ lies adjacent the end face of increased profile inclination. This is the entering side of the worm when the worm drives with the considered thread sides 59'.

It should also be noted that in FIG. 7 the shaft angle differs from a right angle in a direction to result in a larger inclination of the wormgear teeth to the direction of the wormgear axis while in FIG. 11 the shaft angle differs from a right angle in a direction to give the smaller inclination of the wormgear teeth. The inclination of the wormgear teeth is made up of the lead angle of the worm and the complement of the shaft angle, that is its difference from a right angle. In FIG. 7 the two items add to each other. In FIG. 11 they subtract from one another.

A right hand worm may be substituted in FIG. 11 for the left hand worm shown, in such a way that all the features are retained as the mirror images with respect to the mid-plane 60, so that worm axis is in the symmetrical position $40_c$ and the generating line is on the upper side of FIG. 11. The generating line is then also on the side of increased profile inclination, while the shaft angle differs from a right angle in a direction to give the lesser inclination of the wormgear teeth.

Likewise a left hand worm may be substituted in the same manner in FIG. 7.

Cylindrical Worm

Figure 12:
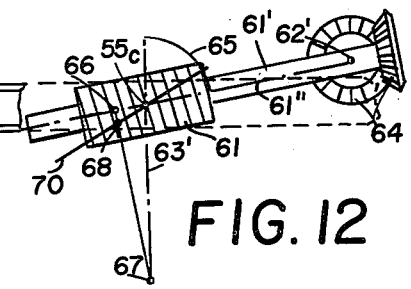
FIG. 12 illustrates a further modification. It is a diagrammatic plan view of a wormgear drive comprising a cylindrical worm with helical thread sides of constant lead and a mating wormgear, having axes at an acute angle, and comprising a further pair of gears so disposed that the imput shaft and the axis of the output member are at right angles to each other.
Figure 13:
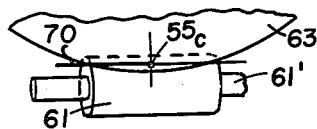
FIG. 13 is a fragmentary and diagrammatic front view corresponding to FIG. 12.
Figure 14:
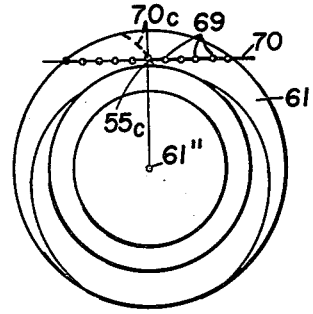
FIG. 14 is an end view taken from the left of the worm shown in FIGS. 12 and 13, at an enlarged scale.

FIGS 12 to 14 illustrate the mesh improvement obtainable with a cylindrical worm 61 having helical threads of constant lead, by deliberately using a shaft angle 65 other than a right angle, even though the axis 62' of the imput shaft and the axis 63' of the output member are at right angles to one another.

In the illustrated example the imput shaft is connected with the worm shaft 61' through a pair of bevel gears 64. And the helical worm 61 meshes with a wormgear 63 connected to the output.

When the axes of the wormgear pair are set conventionally at right angles, the worm and wormgear engage as if the worm were a rack movable along its axis, as is known. There is an instantaneous axis of relative motion between this rack and gear, that passes through the pitch point and is parallel to the wormgear axis. Any point of the driving worm-thread sides is in contact position when its surface normal passes through the said instantaneous axis. The normal projection of the instantaneous axis to a thread side is its instantaneous line of contact. This instantaneous axis intersects only very few threads. On single-thread worms it does not even intersect one thread in all mesh positions, and the tooth action has a duration only a little longer than the tooth action of the mid-section.

An acute shaft angle changes these conditions entirely. Again there is an instantaneous axis (70) through which all the contact normals pass, because here also we are able to substitute a motion that is a true rolling motion. This substituted motion is composed of an axial motion of the worm without turning, and of a helical motion about and along the worm axis so that the helical thread is displaced in itself. The helical motion has the lead of the worm and is made just large enough that the pitch point $55_c$ has zero relative velocity. This means that there is rolling on an instantaneous axis 70 that passes through the pitch point. The direction of axis 70 can be determined by vectorial addition of the angular velocities about the wormgear and worm axes in this substituted motion. Axis 70 intersects the center line 32 of the wormgear pair and lies in a plane parallel to the axes of the worm and wormgear.

It can be demonstrated mathematically that the following simple construction may be used to find the direction of axis 70. Draw a line 66—67 (FIG. 12) at right angles to the worm axis 61". It intersects the worm axis at 66 and the wormgear axis at 67. Then determine the point 68 that intersects distance 66—67 at the ratio of the pitch radii, the distances 66—68 and 68—67 being proportional to the pitch radii (r) of the worm and (R) of the wormgear respectively. If distance 66—67 is made equal to the center distance of the wormgear pair, then distance 66—68 equals r and distance 68—67 equals R. Pitch radius r is shown as a distance 61"—$55_c$ in FIG. 14.

The instantaneous axis 70 intersects a large number of threads. Numeral 69 in FIG. 14 denotes the many intersections. Thus the contact is spread over a large number of teeth. There is also a large gain in the direction of the lines of contact. As they are the projections to the thread surfaces of the instantaneous axis 70, these lines now extend obliquely across the thread surfaces, from top to bottom. They extend across the direction of relative sliding, whereas in the right-angle drives they extend more nearly in the direction of sliding. One such contact line is shown at $70_c$ in FIG. 14. The inclined direction thereof helps to establish a lubricant film and gives efficient tooth action.

Maximum benefit is attained on single-thread worms, used for instance on dividing wheels for gear-producing machines.

Cylindrical Wormgear and Hourglass Worm

Figure 15:
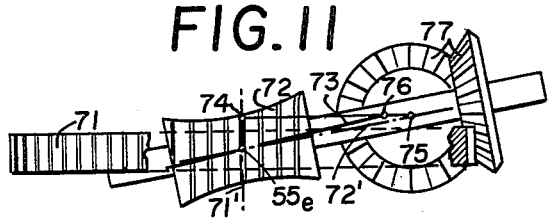
FIG. 15 is a diagrammatic plan view of an angular wormgear drive, where the wormgear is a cylindrical gear that meshes with an hourglass worm.

FIG. 15 illustrates a wormgear drive comprising a spur gear 71 or helical gear and an hourglass worm 72 set at an acute angle to each other. 73 is the instantaneous axis of the substitute motion. Axis 73 intersects the center line of the wormgear pair and extends through the pitch point. It may be determined in analogy with axis 70 of FIG. 12. A line 74—75 is drawn at right angles to the axis 71' of the cylindrical gear 71. It intersects the axes 71', 72' of the gear and worm at points 74 and 75 respectively. We locate point 76 on line 74—75 in such a way that the distances 74—76 and 76—75 are proportional to the pitch radii R, r of the wormgear and worm. Axis 73 passes through the point 76 as well as through the pitch point $55_e$ and lies in a plane parallel to the axes 71', 72'. It intersects a large number of helical teeth and is inclined so that the contact is well spread over the width of the gear face.

When the rotational axes of the wormgear pair are at right angles, the instantaneous axis lies in the mid-plane of the gear. The mesh is then not spread out as well.

The bevel gears 77 place the imput and output axes into directions at right angles to each other.

General Arrangements

Figure 16:
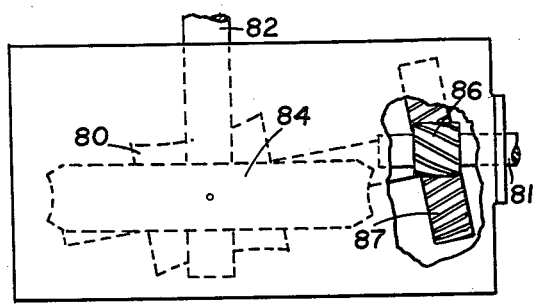
FIG. 16 is a general view of a gear drive constructed according to the present invention, containing an angular wormgear pair and a pair of helical gears with axes set at an angle, so that the imput shaft and output shaft are at right angles to one another.

In the double reduction drive shown in FIG. 16 the wormgear 84 is coaxial with and connected to the output shaft 82. The imput shaft 81 extends at right angles to the direction of the output shaft 82. The invention employs a wormgear pair 80, 84 whose axes are deliberately set at an acute angle to secure the mesh improvements described. The worm 80 is driven from the imput shaft 81 through a pair of helical gears 86, 87 whose axes are at an angle equal to the complement of said acute angle.

Figure 17:
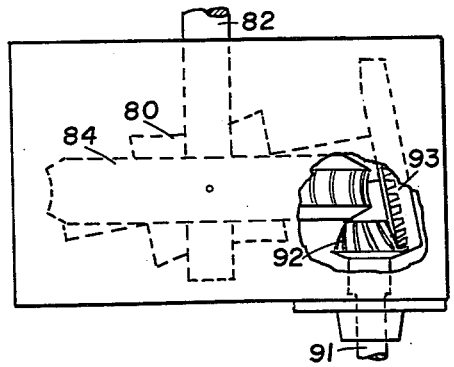
FIG. 17 is a view similar to FIG. 16, showing a drive where the imput and output shafts are parallel to one another.

In the embodiment of FIG. 17 the imput shaft 91 and the output shaft 82 are parallel. The worm 80 of the wormgear pair 80, 84 is connected with the input shaft 91 through a pair of angular bevel gears 92, 93.

Figure 18:
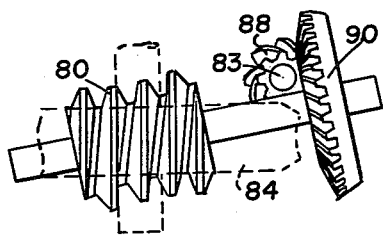
FIG. 18 is a view of a modified gear drive constructed according to the present invention.

The same wormgear pair 80, 84 is used in the gear drive shown in FIG. 18. The worm 80 is driven through a hypoid gear pair 88, 90 from imput shaft 83.

Many other dispositions could be used. Thus the bevel gears 92, 93 of FIG. 17 could be replaced by an angular wormgear drive. The hypoid gear pair 88, 90 of FIG. 18 could be replaced by a bevel gear pair, and so on.

The drives described have the feature in common that an angular wormgear drive, with shaft angle other than a right angle, is used between an imput shaft and an output shaft or axis that are either parallel or have directions at right angle to one another. Broadly the imput shaft extends in the direction of an axial plane of the output member in such a way that its direction is obtainable by adding to the direction of the axis of said output member in said axial plane an integral multiple of a right angle. The imput shaft and the output shaft or axis are at right angles when one right angle is added. They are parallel when two right angles or 180 degrees are added.

While FIGURES 15 to 18 show double-enveloping worm gearing, it should be understood that the worm gearings of FIGS. 12 to 15 could also be used.

*Computation*

A preferred computation procedure will now be described for determining the shaft angle of the disclosed double-enveloping worm gearings, and for determining the tooth contact.

Diagrams FIGS. 19 and 20 are plan views looking at right angles to the axes 40', 41' of a worm and wormgear. FIG. 19 corresponds to FIG. 11, while FIG. 20 corresponds to FIG. 7.

FIGURES 21, 22, 23 are mid-sections of the worm laid through the center line of the wormgear pair at right angles to the worm axis. FIG. 23 shows the pitch point 55. It has a distance $r=55$—$40'$ from the worm axis 40' and a distance $R=55$—$41''$ from the wormgear axis 41'. Let $o'$ and $o''$ denote the angular velocities about the axes 40' and 41' respectively.

In FIG. 19 the worm rotates in the direction of arrow $a$ when the wormgear turns in the direction of arrow $b$.

To determine the lead angle $h$ at the pitch point 55, after the shaft angle $p$ is known, we consider how a point coinciding with the pitch point 55 moves with the worm, and how it moves with the wormgear. The worm point moves in FIG. 19 at right angles to the worm axis 40', in a direction 55—95 and at a velocity $(r \cdot o')$, while the wormgear point moves at right angles to the wormgear axis 41' in a direction 55—96 at a velocity $(R \cdot o'')$. The distances simultaneously covered are in the proportion of $(R \cdot o'')$ to $(r \cdot o')$. Distance 55—96 is $$\frac{R \cdot o''}{r \cdot o'}$$

times the distance $$55\text{--}95 \cdot \frac{o''}{o'}$$

is equal to the proportion $$\frac{n}{N}$$

of the number of threads $n$ in the worm to the number of teeth N in the wormgear. By definition (1) $$\tan h_o = \frac{n}{N} \cdot \frac{R}{r}$$

It is seen then that $$(55\text{--}96) = \tan h_o \, (55\text{--}95)$$

Line 95—96 defines the direction of relative motion and the direction of the pitch line at point 55. It is parallel to the pitch line tangent.

The described relationship can be expressed in a formula (2a) $$\tan h = \frac{\tan h_o \sin p}{1 - \tan h_o \cos p}$$

A similar formula can be derived for the lead angle $h'$ in the case of FIG. 20, where the worm rotates in the direction of arrow $a'$ when the wormgear turns in the direction of arrow $b$:

(2b) $$\tan h' = \frac{\tan h_o \sin p}{1 + \tan h_o \cos p}$$

These known formulas are reproduced here to have the disclosure complete, and especially for the steps taken in the derivation, which will be made use of hereafter.

It will now be shown how the mesh position 56 of any point 56' of the interference or generating line can be determined.

First we determine the tangent plane and the surface normal of the worm thread at point 56'. The tangent plane contains the generating line or its tangent at 56', and it also contains the direction of relative motion at point 56'. This direction can be determined by vectorial addition, as described for the pitch point 55. Thus the tangent plane at 56' is fully defined. The surface normal 97 is perpendicular thereto and can be determined with the known methods of geometry. We can also determine the inclination angle $j$ of the surface normal to the direction of the worm axis and the intersection point 56'' of the normal with the mid-section of the worm, that is with the drawing plane of FIG. 21.

The general contact condition of two members rotatable in a constant proportion requires that the surface normal at any point of contact has leverages with respect to the two rotational axes in proportion to the tooth numbers of said members. In other words, a given force acting along this surface normal (97) exerts turning moments on the two members in the proportion of their tooth numbers. We consider a force whose component perpendicular to the drawing plane of FIG. 21 is equal to unity, to say one pound or one hundredweight. The component in the drawing plane is then $\tan j$. It is the normal projection of the force vector to the drawing plane and extends along the projected normal. In FIG. 21 it is plotted as an arrow from point 56'' to the arrow point.

This force component is inclined to the radius $r' = 40'$—$56''$ at an angle $e$ and is tangent to a circle 98 centered at 40'.

We will now determine the turning moment exerted on the wormgear by this given force. It is the sum of the turning moments $M'$ and $M''$ exerted by the two component forces. The unit force at right angles to the drawing plane exerts a turning moment on the gear proportional to the distance of point 56'' from the projected gear axis (41') and proportional to $\sin p$, the sine function of the shaft angle $p$. When C denotes the center distance 40'—41'' and $u$ denotes the angle 56''—40'—41'', then this part of the turning moment is $$M' = (C - r' \cos u) \sin p$$

The force component $\tan j$ in the drawing plane exerts a turning moment $M_w$ on the worm, its complete turning moment, and a turning moment $M''$ on the gear proportional to the turning moment exerted with respect to center 41'' and proportional to $\cos p$. It is opposite to the component $M'$. Thus $$M_w = r' \tan j \sin e$$
$$M'' = -\cos p \, [M_w + C \tan j \sin (u-e)]$$

With $\sin (u-e) = \sin u \cos e - \cos u \sin e$ and rearrangement, the moment $M = M' + M''$ can be expressed as $$M = C \sin p - M_w \cos p - \cos u \, (r' \sin p - C \tan j \cos p \sin e) - \sin u \cdot (C \tan j \cos p \cos e)$$

There is a moment $M_1$ with the shown position of the normal, when the normal passes through point 56'' and through point 56' of the generating line. Let the angle $u$ of this position be denoted $u_1$. Because of the generation of the worm by a line moving with the wormgear this normal fulfills the kinematic contact condition. The leverages of this normal with respect to the axes 41', 40' are in the proportion of the tooth numbers N, n.

When the normal 97 and its force is turned about the worm axis 40', the moment $M_w$ remains constant. The moment exerted upon the wormgear changes with the turning angle $u$. There is however one other turning angle $u=u_x$ which gives the same moment $M_1$ and which therefore keeps $M_1$ and $M_w$ at the ratio required for contact. With (4) $\quad \text{ctn} g = \left(\dfrac{r'}{C} \tan p \text{ ctn } j - \sin e\right) \div \cos e$ the equation for M can be transformed into $$\cos(u_x - g) = \cos(u_1 - g)$$

or also $$(u_x - g) = -(u_1 - g); u_x = 2g - u_1$$

The turning angle $(u_1 - u_x)$ thus becomes (5) $\quad (u_1 - u_x) = 2(u_1 - g)$ The normal 97 with point 56' gets into gear contact position when point 56'' (FIG. 21) reaches position $56_x$ on circle 99 drawn about the worm axis. 56'' and $56_x$ are the intersection points of said circle with a straight line 100 that is inclined at the above named angle $g$ to the horizontal. The contact point 56 (FIGS. 7, 19) itself is turned away from point 40' about the worm axis by the angle $(u_1 - u_x)$ of Formula 5. This locates the contact position. The procedure applies to any and all points of the generating line, at all turning positions of said line. It permits to determine the entire surface of action.

In the case of FIG. 22 the projected normal 97' touches circle 98 on the opposite side. It is inclined from radius 40'—$56_a$ at an angle $é$ plotted in the opposite direction as compared with angle $e$ in FIG. 21. The above Formulas 4 and 5 can be used in this case also when angle $e = -e'$ is introduced as a negative quantity.

The procedure also applies to the pitch point 55, FIG. 23. Here $r'$ becomes $r$. When $p_a$ denotes the axial pressure angle of the worm at the pitch point, that is the profile inclination of the worm in an axial section, and with $g_0$ denoting the angle $g$ for the pitch point, the formula for $g$ can be transformed into (4) $\quad \text{ctn } g_0 = \text{ctn } p_a \left[\dfrac{r}{C} \tan p - \tan h\right]$ This formula applies to both cases when $h = -h'$ is used in the case of FIGURES 20 and 22. That is, $h$ is introduced as a negative quantity in the latter case, while it is positive in the case of FIGURES 19 and 21.

FIGURES 19 and 21 refer to a left hand worm. The formulas apply also to a right hand worm drive which is the mirror image with respect to the mid-plane 101 (FIG. 19), as is readily understood. In FIG. 21 point $56_c$ then takes the place of point 56'', and the projected surface normal is along dotted lines $97_c$. Similarly the formulas apply also to a left hand worm drive that is the mirror image with respect to mid-plane 102 (FIG. 20).

It is important to know the path of contact and the surface of action for estimating the capacity of the drive. Also it is found that the inclination of the path of contact 55—56 (FIG. 7) to the direction of the worm axis 40' increases with decreasing ratio $N/n$, so that the worm may be shortened on relatively low ratios without any loss of action. Then also the profile inclination or pressure angle can be decreased and the tooth depth increased with benefit. Knowledge of the contact is also important when the worm and wormgear are produced by other processes, which approximate the surface of action while retaining full conjugacy. This will now be further described.

*Modifications*

A worm gearing with approximately the same surface of action as above determined has similar properties. The extended tooth surface of the wormgear intersects the mating thread surface of the worm in an interference line that has nearly the same position and shape, except that it is not absolutely fixed on the wormgear teeth, but may move somewhat during the mesh. This can be allowed for in the selection of angle $u_0 = 55—40'—55'$ (FIG. 23). Angle $u_0$ is double the angle $g_0$, as follows from Formula 5 with $u_x = 0$.

One such modification shall be particularly described here, one that rests on the use of a basic helical member. The wormgear pair has at any instant a relative velocity as if one member thereof were turning about and simultaneously moving along an instantaneous axis. There exist basic helical members that have the same instantaneous relative motion with respect to the worm and the wormgear and that have the same surfaces of action. Not only does their instantaneous axis coincide with the one of the wormgear pair, but also the proportion of translatory motion along the instantaneous axis to the turning motion about it is the same as on the wormgear pair. Such members have been described in my aforesaid articles and in my application Serial No. 544,270.

Of these basic members we select the one that moves in the direction of the tangent 110 (FIG. 24) to the path of contact at pitch point 55. A cutting edge or tool is fixed to this member to move therewith and to follow the surface of action adjacent the pitch point. As the basic member reciprocates helically about and along its axis and the worm rotates on its axis the tool describes an entire thread surface in each stroke. The process is also applicable to the wormgear.

The determination of this basic member will now be described. FIG. 24 corresponds to FIG. 19. We consider the instantaneous motion of points that in one position coincide with pitch point 55 and move at the prescribed timing rate with the worm, with the wormgear and with the basic member respectively. The point moving with the worm moves to position 95 in a considered infinitesimal displacement, the point moving with the wormgear reaches position 96, while the point moving with the basic member reaches position 112. The three points 95, 96 and 112 lie on a line parallel to the pitchline tangent.

Now we consider the angular velocities of the members, and plot the angular velocity of the worm on the worm axis as a vector 55—113, and the angular velocity of the wormgear as a vector 113—114 parallel to the wormgear axis 41'. The distances 113—114 and 55—113 are in the proportion of the tooth numbers $n$, $N$.

Draw a line 113'—114' parallel to 113—114 through a point 114' whose distance 55—114' from point 55 equals distance 95—96. On line 55—114' make distance 114'—115' equal to 96—112. As will be further shown, the axis of the sought basic member is parallel to straight line 113'—115'. It lies in a plane parallel to the axes 40', 41' and intersects the center line of the wormgear pair. It comes closest to the worm axis at the throat of the worm. Its inclination angle to the direction of the worm axis is denoted at 116.

As known, the angular velocities can be vectorially added as if the turning axes were to intersect. The angular velocity about the instantaneous axis is given by distance 55—114' for the mesh between the worm and wormgear, by distance 114'—115' for the mesh between the basic member and the wormgear, and by distance 55—115' for the mesh between the basic member and the worm. The relative angular velocities of the basic member are proportional to the relative linear displacements given by distances 112—96 and 112—95 for the mesh with the wormgear and worm respectively. The proportion of these distances is the same as the proportion of the distances 114'—115' and 55—115' in accordance with the above construction, as required.

Distance 113'—115' also defines the turning angle of the basic member at the scale at which distance 55—113' defines the turning angle of the worm.

When the direction 113'—115' is parallel to the tangent 110 of the path of contact, then the axis 117 of the basic member coincides with tangent 110. Otherwise axis 117 is offset from said tangent. In all cases the lead of the basic member along its axis 117, the axial displacement per full turn, is the axial component of the displacement 55—112 per full turn of the basic member. When the axis 117 is inclined to tangent 110, the angle between them is the complement of the lead angle at point 55 of the basic member. As we know both the lead and the lead angle the radial distance of axis 117 from point 55 can be readily determined.

The lead and offset of the basic member can also be expressed in formulas, see application Serial No. 544,270.

A worm produced in this way has a constant profile coinciding with the cutting edge used on the basic member. It has a constant profile inclination in a helical surface that extends about the axis of the basic member, and more broadly in a surface extending about an axis at a constant distance therefrom, where said axis intersects the center line of the wormgear pair.

I have particularly described fully conjugate worm gearings where the tooth contact sweeps the entire working surfaces of the teeth. It is customary and practical to ease off the tooth surfaces of at least one member adjacent their boundaries, that is to provide crowned tooth surfaces. Such small departures from the mathematical form of the teeth are obtainable by departing very slightly from the exact data obtained for full contact, as is known in the art.

While the invention has been described in connection with several different embodiments thereof, it will be understood that it is capable of further modification, and this application is intended to cover any variations, uses, or adaptations of the invention following, in general, the principle of the invention and including such departures from the present disclosure as come within known or customary practice in the art to which the invention pertains, and as fall within the scope of the invention or the limits of the appended claims.

I claim:

1. Wormgear drive comprising an hourglass worm and a mating enveloping wormgear mounted on offset axes set at an angle other than a right angle to one another, said wormgear having concavely curved tooth bottoms and having different tooth profiles in parallel planes perpendicular to its axis.

2. Wormgear drive comprising an hourglass worm and a mating enveloping wormgear mounted on offset axes set at an angle other than a right angle to one another, said wormgear having different tooth profiles in parallel planes perpendicular to its axis, the extended intermeshing tooth surfaces of said wormgear and worm intersecting in a line outside of the tooth boundaries, said line having an approximately constant position with respect to one member of the wormgear drive.

3. Wormgear drive according to claim 2, wherein said intersection line has an approximately constant position with respect to the wormgear, and is on opposite sides of the wormgear for opposite sides of the wormgear teeth.

4. Wormgear drive according to claim 3, wherein the shaft angle of the wormgear pair is so determined that the surface of action intersects the center line of the wormgear pair, and wherein said intersection line is adjacent one end face of the wormgear.

5. Wormgear drive comprising an hourglass worm and a mating enveloping wormgear having a shaft angle other than a right angle and differing from a right angle by less than thirty degrees, said worm having a thread-profile inclination, in planes perpendicular to the wormgear axis, that decreases from one end face of the wormgear to the other, the intermeshing tooth surfaces being shaped to intersect when extended in lines of approximately constant position with respect to the wormgear and that are outside of and adjacent the end face where the thread-profile inclination is larger, while said shaft angle differs from a right angle in a direction to give the lesser inclination of the wormgear teeth to the direction of the wormgear axis.

6. Wormgear drive comprising an hourglass worm and a mating enveloping wormgear having a shaft angle other than a right angle and differing from a right angle by less than thirty degrees, said worm having a thread-profile inclination, in planes perpendicular to the wormgear axis, that decreases from one end face of the wormgear to the other, the intermeshing tooth surfaces being shaped to intersect when extended in lines of approximately constant position with respect to the wormgear, said lines being outside of and adjacent the end face where the thread-profile inclination is smaller, while said shaft angle differs from a right angle in a direction to result in the larger inclination of the wormgear teeth to the direction of the wormgear axis.

7. Wormgear drive comprising an hourglass worm and a mating enveloping wormgear having a shaft angle other than a right angle and differing from a right angle by less than thirty degrees, said worm having thread sides such as may be described on the rotating worm by moving a line about an axis offset from and disposed at an acute angle to the worm axis, said offset axis intersecting the center line of the wormgear pair and lying in a plane that is parallel to the worm axis and that extends in the direction of the wormgear axis.

8. Wormgear drive according to claim 7, wherein the line moving about an offset axis also moves along said axis in direct proportion to its turning motion about said axis.

9. An hourglass worm having thread sides extending from end to end of the worm, each thread side having a constant profile inclination in a surface that extends about an axis at a constant distance from said axis, said axis being disposed at an acute angle to the worm axis and having a minimum distance therefrom at the gorge of the worm.

10. An hourglass worm having threads, each thread side having a straight profile in a surface of revolution whose axis is offset from and disposed at an acute angle to the worm axis.

11. A wormgear drive as claimed in claim 7 having a rotary input member and a rotary output member at least one of which is a shaft, said output member being coaxial with said wormgear and being connected thereto to rotate therewith, and gearing connecting said worm with said input member.

12. A wormgear drive as claimed in claim 11 in which said input member has its axis parallel to the axis of said wormgear.

13. A wormgear drive as claimed in claim 11, in which said input member has its axis at right angles to the axis of said wormgear.

References Cited in the file of this patent

UNITED STATES PATENTS

| | | |
|---|---|---|
| 633,753 | Cowan | Sept. 26, 1899 |
| 669,945 | Moomy | Mar. 12, 1901 |
| 1,489,750 | Fraley | Apr. 8, 1924 |
| 1,836,587 | Godfrey | Dec. 15, 1931 |
| 1,902,683 | Wildhaber | Mar. 21, 1933 |
| 2,040,287 | Ware | May 12, 1936 |
| 2,842,976 | Young | July 15, 1958 |
| 2,935,888 | Wildhaber | May 10, 1960 |
| 2,973,660 | Popper | Mar. 7, 1961 |

FOREIGN PATENTS

| | | |
|---|---|---|
| 812,141 | Germany | Aug. 27, 1951 |